(12) United States Patent
Pachschwoell et al.

(10) Patent No.: US 7,943,247 B2
(45) Date of Patent: May 17, 2011

(54) INSULATING MATERIAL CAPABLE OF WITHSTANDING CYCLICALLY VARYING HIGH TEMPERATURES

(75) Inventors: Heino Pachschwoell, Twistetal (DE); Joachim Klose, Oederan (DE); Christiane Rothe, Obergruna (DE); Stefan Jonas, Freiberg (DE); Thomas Stolte, Freiberg (DE)

(73) Assignee: FNE Forschungsinstitut Fuer Nichteisen-Metalle Freiberg GmbH, Freiberg (DE)

( * ) Notice: Subject to any disclaimer, the term of this patent is extended or adjusted under 35 U.S.C. 154(b) by 822 days.

(21) Appl. No.: 11/897,260

(22) Filed: Aug. 28, 2007

(65) Prior Publication Data

US 2008/0166574 A1    Jul. 10, 2008

(30) Foreign Application Priority Data

Aug. 29, 2006   (DE) .......................... 10 2006 040 360

(51) Int. Cl.
*B32B 9/00*   (2006.01)
(52) U.S. Cl. .................. 428/701; 428/702; 428/469
(58) Field of Classification Search .................. None
See application file for complete search history.

(56) References Cited

U.S. PATENT DOCUMENTS

| | | | |
|---|---|---|---|
| 6,586,115 B2 * | 7/2003 | Rigney et al. .............. | 428/633 |
| 2002/0086119 A1 | 7/2002 | Hariharan | |
| 2004/0101699 A1 | 5/2004 | Vassen et al. | |

FOREIGN PATENT DOCUMENTS

| | | |
|---|---|---|
| DE | 198 01 424 A1 | 7/1999 |
| DE | 101 58 639 A1 | 10/2002 |
| EP | 1 249 515 A2 | 10/2002 |
| EP | 1 679 390 A2 | 7/2006 |
| WO | WO 99/23271 A1 | 5/1999 |
| WO | WO 02/081768 A2 | 10/2002 |

\* cited by examiner

*Primary Examiner* — Timothy M Speer
(74) *Attorney, Agent, or Firm* — Kilpatrick Townsend & Stockton LLP

(57) ABSTRACT

A heat insulation material based on ceramic material includes a top layer containing $BaZrO_3$ and $Y_2O_3$ doped $ZrO_2$. A heat insulation material preferably consists of at least one adhesion promotion layer, at least one intermediate layer arranged thereon and a top layer arranged thereon, with the adhesion promotion layer consisting of MeCrAlY, where Me is nickel and/or cobalt, the intermediate layer consists of $Y_2O_3$ doped $ZrO_2$ and the top layer consists of 15 to 25% by weight $BaZrO_3$ and 75 to 85% by weight $Y_2O_3$ doped $ZrO_2$. A method of coating a substrate with a heat insulation material includes the step of applying an aforesaid top layer to an optionally coated substrate by a thermal spray method or an electron beam method, in particular an EB-PVD method.

10 Claims, 1 Drawing Sheet

INSULATING MATERIAL CAPABLE OF WITHSTANDING CYCLICALLY VARYING HIGH TEMPERATURES

CROSS-REFERENCES TO RELATED APPLICATIONS

This application claims the priority of German Application No. 10 2006 040 360.6 filed on Aug. 29, 2006, the disclosures of which are incorporated herein by reference.

BACKGROUND OF THE INVENTION

The present invention relates to a heat insulation material on a ceramic base as well as to a method of coating a substrate with such a heat insulation material.

Ceramic heat insulation materials are in particular suitable for high-temperature use and therefore used, for example, in gas turbine components, such as combustion chamber elements and turbine vanes, or in engine cylinders. It is the function of the heat insulation materials to protect the substrates coated with them from temperatures which are too high. This is, for example, necessary with inner walls of engine cylinders which are exposed to ever higher temperatures in operation due to the endeavor to increase efficiency and thereby to lower the specific fuel consumption of the engine, the temperatures often reaching or surpassing the limits of use of the base materials despite a direct cooling and a specific construction of the components.

As a rule, the heat insulation materials include a functional layer of ceramic material, for example of $Y_2O_3$ doped $ZrO_2$. Due to the high porosity and the high diffusion coefficient for oxygen, the functional layer, however, frequently does not protect the substrate material or at least does not protect it sufficiently against oxidation or hot gas corrosion. In addition the adhesion of the $Y_2O_3$ doped $ZrO_2$ layer on the substrate, for example the base material of a turbine vane, is not sufficient. For this reason, the known heat insulation materials usually include an adhesion promotion layer which is arranged beneath the functional layer and which should inter alia ensure the required adhesion of the functional layer on the substrate.

However, a failure of the layer systems occurs in the known layer systems due to different thermal coefficients of expansion, insufficient phase stability, the growth and the behavior of the thermally grown oxide layer on the adhesion layer, an insufficient oxidation resistance and hot gas corrosion resistance and further influences, in particular under highly fluctuating conditions of use, i.e. under conditions of use in which high and low temperatures change periodically. There are different types of failure in dependence on the type of strain. Two important breakdown mechanisms are failure in the ceramic material at high temperatures and the peeling of parts of the heat insulation layer at rather low strain temperatures. Sintering behavior and phase stability play an important role for the failure in the ceramic material. The failure mechanism at the rather low temperatures is closely associated with the growth of the oxide layer (TGO) on the adhesion promotion layer.

A heat insulation material is, for example, known from DE 198 01 424 A1 which can in particular be used at temperatures of more than 1,000° C. and which consists of a top layer substantially consisting of $BaZrO_3$ and/or $La_2Zr_2O_7$ and/or $SrZrO_3$ and an intermediate layer or adhesion promotion layer arranged thereunder made of an MeCrAlY alloy, where Me=Ni or Co.

A thermal insulation layer is disclosed in DE 101 58 639 A1 on the basis of $La_2Zr_2O_7$ in which 10 to 90% of the lanthanum is replaced by neodymium, dysprosium, samarium or europium, the heat insulating layer being applied by plasma spraying onto an adhesion promotion layer of MeCrAlY applied to a substrate.

However, the two aforesaid heat insulation materials are also in need of improvement with respect to their heat insulation, in particular under conditions of use which change a lot thermally or under cyclic temperature strain.

SUMMARY OF THE INVENTION

It is an object of the present invention to provide a heat insulation material which is also in particular characterized by excellent heat insulation with cyclic temperature strain, i.e. under conditions of use in which high and low temperatures change periodically.

This object is satisfied in accordance with the invention by a heat insulation material on the basis of a ceramic material which includes a top layer containing $BaZrO_3$ and $Y_2O_3$ doped $ZrO_2$.

It was surprisingly possible to discover within the framework of the present invention that a heat insulation material consisting of a top layer containing $BaZrO_3$ and $Y_2O_3$ doped $ZrO_2$ not only has excellent high temperature resistance, but also and in particular a high stability with respect to temperatures changing a lot and fast. For this reason, the heat insulation material in accordance with the invention can in particular be used as a heat insulation coating of substrates such as bases of engine pistons or surface materials of turbine vanes in a gas turbine which are exposed to cyclic temperature strains during their operation.

Particularly good results with respect to the heat insulation effect and the cyclic temperature strain are in particular obtained when the top layer of the heat insulation material in accordance with the invention consists of $BaZrO_3$ and $Y_2O_3$ doped $ZrO_2$.

The two aforesaid compounds in the top layer can generally be contained in any desired relative ratio to one another. The top layer preferably contains 10 to 50% by weight $BaZrO_3$ and 50 to 90% by weight $Y_2O_3$ doped $ZrO_2$, particularly preferably 10 to 30% by weight $BaZrO_3$ and 70 to 90% by weight $Y_2O_3$ doped $ZrO_2$, and very particularly preferably 15 to 25% $BaZrO_3$ and 75 to 85% by weight $Y_2O_3$ doped $ZrO_2$.

In accordance with a further preferred embodiment of the present invention, the top layer of the heat insulation material in accordance with the invention consists of 10 to 50% by weight $BaZrO_3$ and 50 to 90% by weight $Y_2O_3$ doped $ZrO_2$, particularly preferably 10 to 30% by weight $BaZrO_3$ and 70 to 90% by weight $Y_2O_3$ doped $ZrO_2$, and very particularly preferably 15 to 25% by weight $BaZrO_3$ and 75 to 85% by weight $Y_2O_3$ doped $ZrO_2$.

Very particularly good results are obtained when the top layer consists of 20% by weight $BaZrO_3$ and 80% by weight $Y_2O_3$ doped $ZrO_2$.

To achieve good adhesion of the top layer on the substrate, it is proposed in a further development of the idea of the invention that the heat insulation material has at least one adhesion promotion layer, and preferably precisely one adhesion promotion layer, in addition to a top layer. Furthermore, at least one intermediate layer, which can serve, for example, for the increasing of the corrosion resistance of the heat insulation material, can also be arranged between the at least one adhesion promotion layer and the top layer.

In a further development of the idea of the invention, it is proposed to provide at least one adhesion promotion layer made of a material containing MeCrAlY, where Me is nickel and/or cobalt. Particularly good results are obtained with this embodiment when the at least one adhesion promotion layer consists of MeCrAlY, where Me is nickel and/or cobalt.

Provided that the heat insulation material includes an intermediate layer, this preferably contains $Y_2O_3$ doped $ZrO_2$, with the intermediate layer particularly preferably consisting of $Y_2O_3$ doped $ZrO_2$.

In accordance with a further preferred embodiment of the present invention, the heat insulation material in accordance with the invention consists of at least one adhesion promotion layer, at least one intermediate layer arranged thereon and a top layer arranged thereon, with the adhesion promotion layer consisting of MeCrAlY, where Me=Ni and/or Co, the intermediate layer consisting of $Y_2O_3$ doped $ZrO_2$ and the top layer consisting of 15 to 25% $BaZrO_3$ and 75 to 85% $Y_2O_3$ doped $ZrO_2$.

A further subject matter of the present invention is a method of coating a substrate with the heat insulation material in accordance with the invention including the step of applying a top layer composed as above onto an optionally coated substrate by a thermal spray method or an electronic beam method, in particular an EB-PVD (electron beam physical vapor deposition) method.

All thermal spray methods and electron beam methods, in particular EB-PVD methods, known to the person skilled in the art can be used to apply the top layer onto the optionally coated substrate with in particular the application of the top layer by high velocity flame spraying or plasma spraying having proven to be particularly suitable for this purpose. The application of the top layer to the optionally coated substrate particularly preferably takes place by plasma spraying.

For the manufacture of the top layer, i.e. the mixture of $BaZrO_3$ and $Y_2O_3$ doped $ZrO_2$, all the methods known to the skilled person for this purpose can be used, in particular powder methods. The manufacture of the top layer preferably takes place by mixing $BaZrO_3$ in powder form and $Y_2O_3$ doped $ZrO_2$ in powder form and applying the powder mixture obtained in this manner to the optionally coated substrate by a thermal spray method or an electron beam method, in particular an EB-PVD method.

In a further development of the idea of the invention, it is proposed to use $BaZrO_3$ with a grain size between 1 and 2 μm and/or $Y_2O_3$ doped $ZrO_2$ with a grain size between 5 and 25 μm for the manufacture of the aforesaid powder mixture.

To obtain a good sprayability and effective distribution of the $BaZrO_3$ in the manufacture of the powder mixture, the $BaZrO_3$ is pressed to form a pressed body, preferably using a bonding aid, and is sintered to form a solid ceramic material before the mixing with the $Y_2O_3$ doped $ZrO_2$ before the ceramic material obtained in this manner is prepared as a powder with a grain size between 10 and 125 μm by means of a jaw crusher and/or a ball mill, for example.

The heat insulation material in accordance with the invention is generally suitable for the coating of all substrates and in particular of all substrates exposed to high temperature applications. Al piston alloys and Ni-based super alloys are named as suitable substrate materials only by way of example.

To obtain good adhesion of the top layer on the substrate, the substrate in the method in accordance with the invention is preferably first coated with an adhesion promotion layer, and optionally an intermediate layer, before the top layer is applied to it. In this connection, the adhesion promotion layer preferably consists of MeCrAlY, where Me is nickel and/or cobalt.

layer and the top layer, it preferably consists of $Y_2O_3$-dotiertem $ZrO_2$.

In a further development of the idea of the invention, it is proposed also to apply the adhesion promotion layer and/or the intermediate layer to the substrate by a thermal spray method or an electron beam method, in particular an EB-PVD method, and particularly preferably by plasma spraying.

The present invention will be described in the following purely by way of example with reference to advantageous embodiments and to the enclosed drawing.

BRIEF DESCRIPTION OF THE DRAWINGS

The FIGURE shows a schematic cross-section of a substrate coated with the heat insulation material in accordance with the invention.

DESCRIPTION OF THE PREFERRED EMBODIMENTS

Figure 1:
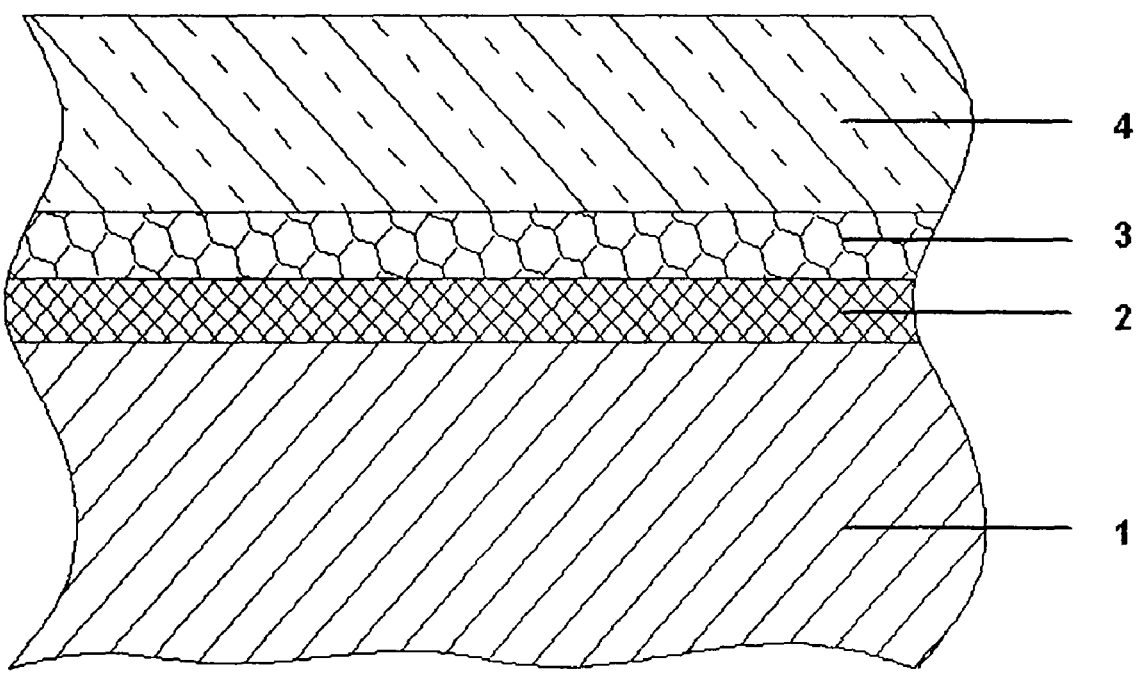

The structure shown in the FIGURE consists of a substrate 1, for example consisting of an aluminum piston alloy or an Ni-based super alloy, to whose surface an adhesion promotion layer 2 is applied to improve the adhesion between the substrate and the layers arranged over the adhesion promoter. An intermediate layer 3 is arranged over the adhesion promoter and, for example, improves the corrosion properties of the heating insulation material. Finally, a top layer 4 is located on the intermediate layer 3.

The present invention will be explained in the following with reference to an example illustrating the idea of the invention, but not limiting the invention.

Example

To manufacture a heat insulation material composed as shown schematically in the FIGURE, a 50 μm thick MeCrAlY layer was sprayed onto an Ni-based super alloy by atmospheric plasma spraying of amperite powder 410.1 using hydrogen and argon as the process gases. The Ni substrate was heated, preferably to approximately 200° C., directly before coating.

Immediately after the application of the MeCrAlY adhesion promotion layer, the spraying on took place of a $Y_2O_3$ doped $ZrO_2$ intermediate layer with a thickness of 50 μm while using specific spray powder Abler 4023.0 with a grain size of 5 to 25 μm. The intermediate layer was likewise applied by atmospheric plasma spraying using hydrogen and argon as the carrier gases.

Directly after the application of the intermediate layer, a mixture consisting of 20% $BaZrO_3$ and 80% $Y_2O_3$ doped $ZrO_2$ was in turn sprayed on by atmospheric plasma spraying while using hydrogen and argon as the process gases. This functional top layer had a thickness of 150 μm. For the manufacture of the powder mixture, Abler 4023.0 ($Y_2O_3$ doped $ZrO_2$) with a grain size of 5 to 25 μm and Alfa Aesar 12009-21-1 ($BaZrO_3$) with a grain size of 1 to 2 μm were used as the starting powder.

To achieve a good sprayability and an effective distribution of the $BaZrO_3$, the $BaZrO_3$ was prepared before the mixing. For this purpose, the Alfa Aesar powder was pressed to form pressed bodies, using a bonding agent, and sintered to form a solid ceramic material in a stage process. These ceramic bodies were prepared to a spray powder with a grain size of 10 to 125 μm by means of jaw crushers and a ball mill. The coated specimen bodies were subjected both to cyclic temperature strain (7 sec. flame+7 sec. $CO_2$ cooling and 7 sec. flame+7 sec. compressed air cooling) and to a test simulating the cyclic long-term temperature conditions of the piston strain. The layer system was still completely intact after 500 cycles (flame+$CO_2$) and 500 cycles (flame+compressed air) or 1960 cycles of the simulated long-term test.

The invention claimed is:

1. A heat insulation material on the basis of ceramic material comprising a top layer containing $BaZrO_3$ and $Y_2O_3$ doped $ZrO_2$, at least one adhesion promotion layer and at least one intermediate layer arranged between the adhesion promotion layer and the top layer, wherein the at least one intermediate layer contains $Y_2O_3$ doped $ZrO_2$.

2. A heat insulation material in accordance with claim 1, wherein the top layer consists of $BaZrO_3$ and $Y_2O_3$ doped $ZrO_2$.

3. A heat insulation material in accordance with claim 1, wherein the top layer contains or consists of 10 to 50% by weight $BaZrO_3$ and 50 to 90% by weight $Y_2O_3$ doped $ZrO_2$.

4. A heat insulation material in accordance with claim 1, wherein the top layer consists of 20% by weight $BaZrO_3$ and 80% by weight $Y_2O_3$ doped $ZrO_2$.

5. A heat insulation material in accordance with claim 1, wherein the top layer contains or consists of 15 to 25% by weight $BaZrO_3$ and 75 to 85% by weight $Y_2O_3$ doped $ZrO_2$.

6. A heat insulation material in accordance with claim 1, wherein the top layer consists of 20% by weight $BaZrO_3$ and 80% by weight $Y_2O_3$ doped $ZrO_2$.

7. A heat insulation material in accordance with claim 1, wherein the at least one adhesion promotion layer contains MeCrAlY, where Me is nickel and/or cobalt.

8. A heat insulation material in accordance with claim 7, wherein the at least one adhesion promotion layer consists of MeCrAlY, where Me is nickel and/or cobalt.

9. A heat insulation material in accordance with claim 1, wherein the at least one intermediate layer consists of $Y_2O_3$ doped $ZrO_2$.

10. A heat insulation material consisting of at least one adhesion promotion layer, at least one intermediate layer arranged thereon and a top layer arranged thereon, with the adhesion promotion layer consisting of MeCrAlY, where Me is nickel and/or cobalt, the intermediate layer consists of $Y_2O_3$ doped $ZrO_2$ and the top layer consists of 15 to 25% by weight $BaZrO_3$ and 75 to 85% by weight $Y_2O_3$ doped $ZrO_2$.

* * * * *